No. 897,489. PATENTED SEPT. 1, 1908.
F. PRINZ.
GRAIN AND SEED SEPARATOR
APPLICATION FILED JUNE 24, 1907.

2 SHEETS—SHEET 1.

Witnesses: Inventor,

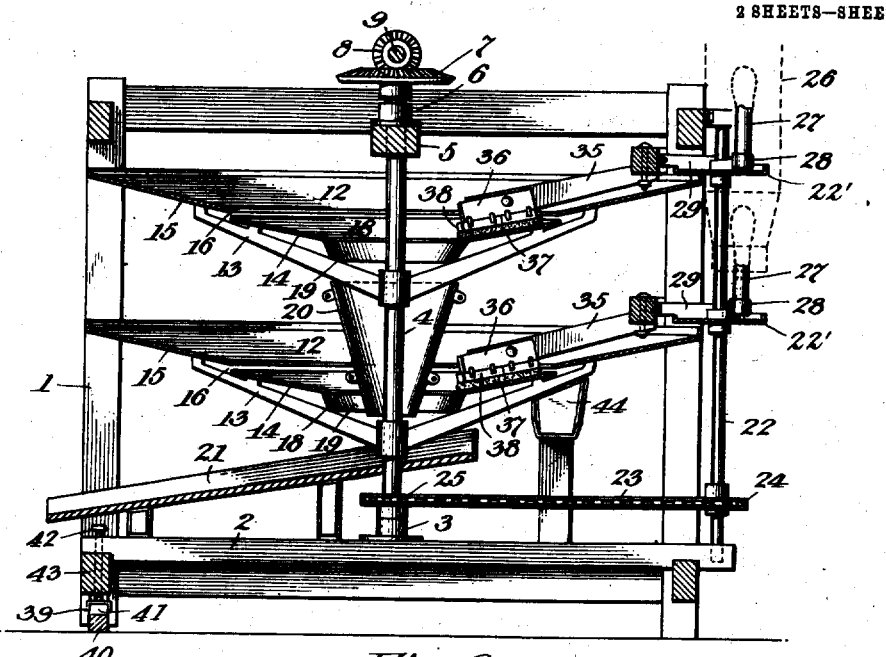

UNITED STATES PATENT OFFICE.

FAUSTIN PRINZ, OF MILWAUKEE, WISCONSIN.

GRAIN AND SEED SEPARATOR.

No. 897,489.   Specification of Letters Patent.   Patented Sept. 1, 1908.

Application filed June 24, 1907. Serial No. 380,604.

*To all whom it may concern:*

Be it known that I, FAUSTIN PRINZ, a citizen of the United States, residing at Milwaukee, in the county of Milwaukee and State of Wisconsin, have invented certain new and useful Improvements in Grain and Seed Separators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to grain separators, more particularly for the separation of small round seeds or grains.

It has for its object to provide such a separator that will have larger capacity for separation than previous constructions, and in which the separation will be more thoroughly effected.

Figure 1:
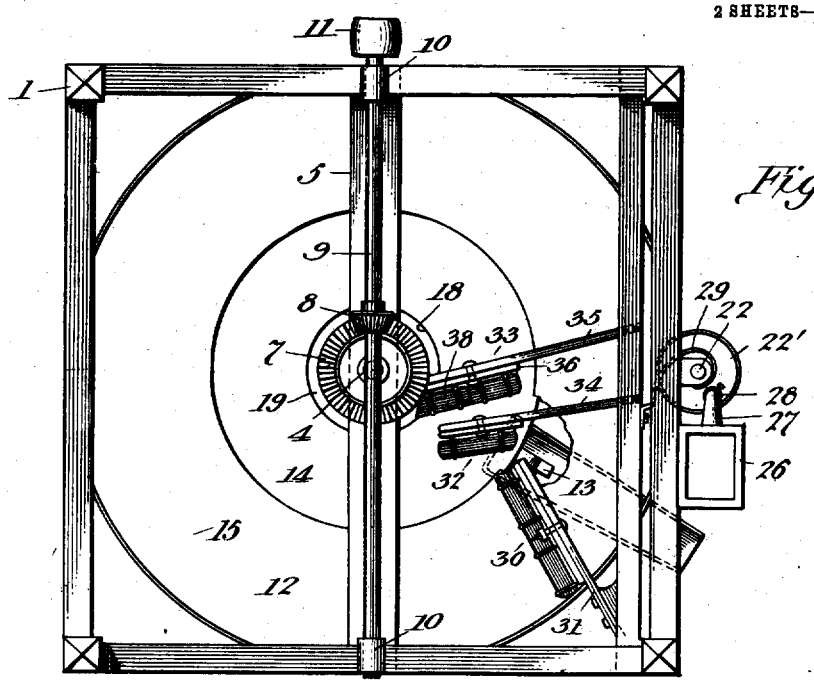
Figure 2:
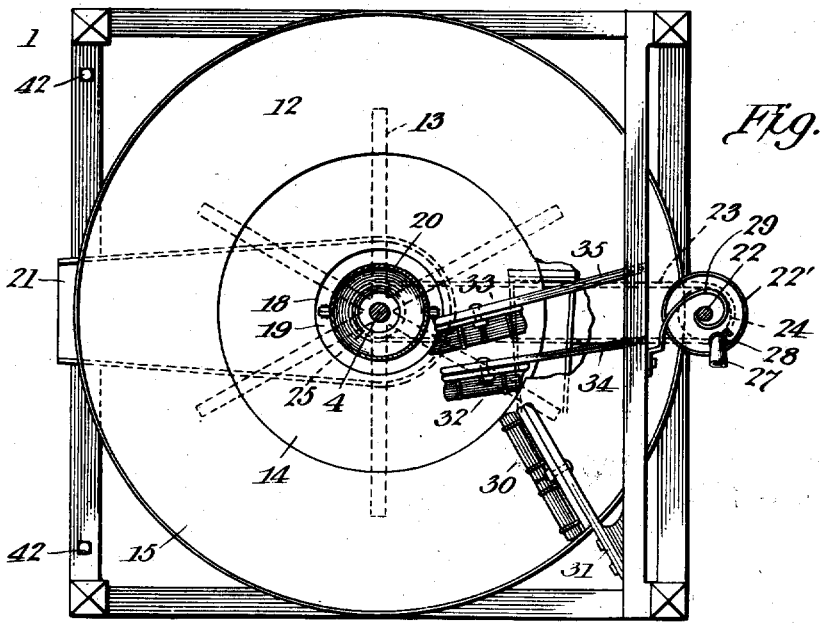

To the accomplishment of the foregoing and such other objects as may hereinafter appear the invention consists in the features hereinafter more particularly described and then sought to be clearly defined by the claims, reference being had to the accompanying drawing forming a part hereof, and in which Figure 1 is a plan view of the machine; Fig. 2 is a similar view with the top pan omitted, and parts in section; Fig. 3 is a vertical section through the machine, and Figs. 4, 5, 6, 7 and 8 are detail views.

In the drawing, the numeral 1 designates a frame formed of timbers bolted together and provided at its lower portion with a cross timber 2 in which is suitably stepped, for instance in a boxing 3, an upright rotatable shaft 4 passing through a cross timber 5 at the upper part of the frame and having a boxing or collar 6 through which the shaft passes, the shaft at its upper end being provided with a bevel wheel 7 with which meshes a bevel pinion 8 mounted on a cross shaft 9 journaled in suitable boxes 10 and having a pulley 11 to which power will be transmitted from a suitable source so as to impart a slow rotary movement to the upright shaft.

The upright shaft carries any desired number of concave pans 12, two being illustrated, each of which is supported by arms or spokes 13 suitably secured to the shaft. Each pan is formed of an inner plate 14 and an outer plate 15, the outer plate preferably being given somewhat greater pitch or inclination than the inner plate. At the adjacent edges of the two plates of each pan there is formed a space or opening 16 between the plates, which in practice may be ¾ of an inch, more or less, and the inner edge of the upper plate may be and preferably is formed with an overhanging ledge 17 which will serve to prevent material from passing upward from the inner plate onto the outer plate and to cause said material to pass through the opening formed as described in the pan. The lower portion of the pan adjacent to the vertical shaft will be formed with a central opening or eye 18, the pan at such point being formed with what for convenience may be termed a spout 19 which preferably is made conical or funnel-shaped. The space between an upper and a lower pan, around the shaft, is inclosed by a conducting tube or spout 20, which may be stationary, or revolve with the pans, so as to conduct the seeds or round grains, mustard or other seed, discharged from one pan down to an inclined trough 21 by which they will be conducted off.

At one side of the frame is an upright shaft 22 carrying distributing plates 22, one for each pan, said shaft deriving motion through a chain or other form of belt 23 passing around a pulley 24 on said shaft and around a pulley 25 on the upright shaft 4. The material containing the seed or grain is fed to each distributer from a spout 26 from which a spout 27 of smaller dimensions leads to each distributer plate, each spout 27 being provided with a telescopic end portion or nozzle 28 which can regulate the feed to the plate by raising or lowering the nozzle to control the amount of material to pass on to each plate. For the purpose of feeding the material in a thin stream from each distributing plate to its respective pan, a scraper 29 is provided for each plate said scraper preferably being curved as shown and supported by having one end thereof connected to one of the cross timbers of the frame as illustrated.

For the purpose of directing the material in certain desired directions over each pan, a series of scrapers or deflectors are employed. One of these deflectors is designated by the numeral 30 and extends obliquely in the direction of rotation of the pan from the outer edge thereof to the inner edge of the outer plate, or to the point where the inner plate of the pan is spaced from the outer plate of the pan, said scraper being supported by an arm 31. The second deflector 32 extends obliquely in the other direction, somewhat in advance of the deflector 30 in the direction of rotation of the pan and has one end terminating quite close to the opening between the two plates of the pan and covers about one-third of the cross sectional area of the inner plate of the pan. The third deflector 33 extends in the same direction as the second deflector, in advance thereof, and has its lower end terminating practically at the inner edge of the plate while its other end terminates a short distance back from the opening between the inner and outer plates of the pan. The deflectors 32 and 33 are supported respectively by the arms 34 and 35. Each of these scrapers or deflectors is composed of a rigid member 36 of wood or other material bolted to its respective arm and provided on its lower edge with a flexible strip 37 preferably of felt about ¾ of an inch thick and provided with a weight 38 which may be of metal so that the deflector will bear snugly against the surface of the pan and conform to any irregularities in the surface thereof.

While ordinarily the upright shaft 4 will stand vertical yet at times it may be desirable to give it a slight inclination, and to enable that to be done two of the upright timbers of the frame are formed at their lower ends with a slot 39 so as to straddle a cross timber 40 which will be provided with metal faced blocks 41 against which will bear adjusting screws 42 passing through the cross timber 43 of the frame so that one end of the frame may be raised or lowered to give the desired inclination to the upright shaft 4. This may be varied from zero to two inches, more or less, as desired, although as stated ordinarily no inclination will be needed.

In operation, the material containing the grain or seed is delivered from the feed spout onto the rotating feed distributing plates from whence it passes in a thin stream onto the several slowly revolving pans. From the pan, the small round seeds or grains roll down the inclined surface of the pan and through the eye down to the inclined delivering spout at the bottom of the machine. The seeds which are not round and any material mixed with it, passes only part the way down and comes to a state of rest and is carried in the rotation of the pan around to the first scraper or deflector 30. This scraper deflects the material and causes it to pass from the outer plate of the pan down onto the lower plate thereof, the round seeds rolling down to the central opening through which they escape, and the material not rolling down and caught by the second scraper 32 is deflected upwardly and passes out through the opening between the two plates and is received by an inclined trough 44 (one of said troughs being provided for each pan).

The material which slides down the inner pan below the scraper 32 comes to a state of rest without reaching the central discharge opening in the pan and with it some of the round seeds. These seeds strike the third scraper 33 by which they are again started to rolling again and such of them as are carried up with the other material by this scraper pass around the upper edge of the scraper and when they pass the same they roll down and pass through the center opening in the inner pan. The other material slides on the inner pan after passing the third scraper but comes to a state of rest before reaching the central discharge opening in the pan, and in the continued rotation of the pan is again brought against the second scraper 32 which directs it through the opening between the two pans. The seeds which roll from the outer pan onto the inner pan strike the inner pan, by reason of their momentum at a point below that at which rests the material passing around the upper end of the third scraper 32 and consequently are not struck by such material resting on the inner pan near its upper edge.

This construction, in practice, has been found to give the maximum capacity to a separator of this type and to effect most thoroughly the separation of the round mustard seed from other seeds and refuse material.

I have described and illustrated with particularity the preferred details of construction of the several parts but it is obvious that changes can be made which will be embraced within the scope of the appended claims.

Having described my invention and set forth its merits, what I claim is:—

1. The grain and seed separator, comprising a concave pan the wall whereof inclines from its center upwardly, having its upper portion formed with a greater pitch than its lower portion and formed with a central discharge opening, the inclination of the wall being such that grain initially fed onto the upper portion thereof will be carried around in the rotation of the pan while portions thereof will move down the wall to the central discharge opening, means for initially feeding grain onto the upper portion of the wall, and means for rotating said pan, substantially as described.

2. The grain and seed separator, comprising a concave pan having a portion thereof between its inner and outer edges formed with a circumferentially extending opening, the portion of the wall of the pan above said opening having such inclination as to support grain deposited thereon and permit some of the grain to move from the upper onto the lower portion of the wall, means for deflecting through said opening a portion of the material fed onto the pan, and means for rotating said pan, substantially as described.

3. The grain and seed separator comprising the concave pan formed of inner and outer plates, the outer plate having a greater pitch than the inner plate and formed to support grain deposited thereon and permit a portion of it to move onto the inner plate, a circumferentially extending opening being formed between the two plates, means for deflecting through said opening a portion of the material fed onto the pan, and means for rotating the pan, substantially as described.

4. The grain and seed separator comprising a rotatable concave pan having a portion thereof between its inner and outer edges formed with a circumferentially extending opening for the discharge of material carried by the pan, the wall of the pan above said opening having such inclination as to support grain deposited thereon and permit a portion of it to move onto the wall below the opening, and a spout to receive material discharged through said opening, substantially as described.

5. The grain and seed separator comprising a concave rotatable pan having a central discharge opening, and a rotatable feed distributing plate for delivering material onto the inclined surface of said pan with an impetus directing it towards the center of the pan, substantially as described.

6. The grain and seed separator comprising a concave rotatable pan, a rotatable feed distributing plate which receives the material and delivers it to said pan with an impetus directing it towards the center of the pan, and a scraper on said plate, substantially as described.

7. The grain and seed separator, comprising a concave rotatable pan, a rotatable feed distributing plate which receives and delivers material to said pan with an impetus directing it towards the center of the pan, and a spout provided with an adjustable nozzle for regulating the supply of material to said plate, substantially as described.

8. The grain and seed separator comprising a concave rotatable pan, and a scraper extending partially from the periphery towards the center of the pan and inclined inwardly in the direction of rotation of the pan, said scraper serving to prevent the travel of the material past it and directing it towards the lower part of the pan, substantially as described.

9. The grain and seed separator, comprising a concave rotatable pan, having a circumferentially extending opening, means for feeding material onto the pan adjacent to its periphery, and a scraper inclined inwardly in the opposite direction to the rotation of the pan and having one end in proximity to said opening to direct material from the pan into said opening, substantially as described.

10. The grain and seed separator comprising a rotatable pan having a central discharge opening, and a scraper inclined inwardly in the opposite direction to the rotation of the pan and extending from the central opening towards the periphery of the pan, and terminating below the pan's periphery for deflecting material upwardly and around the upper end of the scraper, substantially as described.

11. The grain and seed separator comprising a rotatable pan having a central discharge opening and a circumferentially extending opening between its upper and lower portions, means for feeding material onto the pan adjacent to its periphery, a scraper extending in the direction of rotation of the pan from its periphery inwardly, a second scraper inclined inwardly in the opposite direction to the rotation of the pan and having one end terminating in proximity to said circumferentially extending opening, and a third scraper extending inwardly in the opposite direction to the rotation of the pan with its upper end terminating back from said circumferentially extending opening, substantially as described.

12. The grain and seed separator comprising a rotatable pan, and a scraper, said scraper having a laterally projecting weighted flexible edge in contact with the pan, substantially as described.

In testimony whereof I affix my signature in presence of two witnesses.

FAUSTIN PRINZ.

Witnesses:
  J. P. MURPHY,
  W. F. FILTER.